Oct. 22, 1957 A. C. WARNER 2,810,188
THREAD CUTTING TOOL
Filed March 28, 1955 2 Sheets-Sheet 1
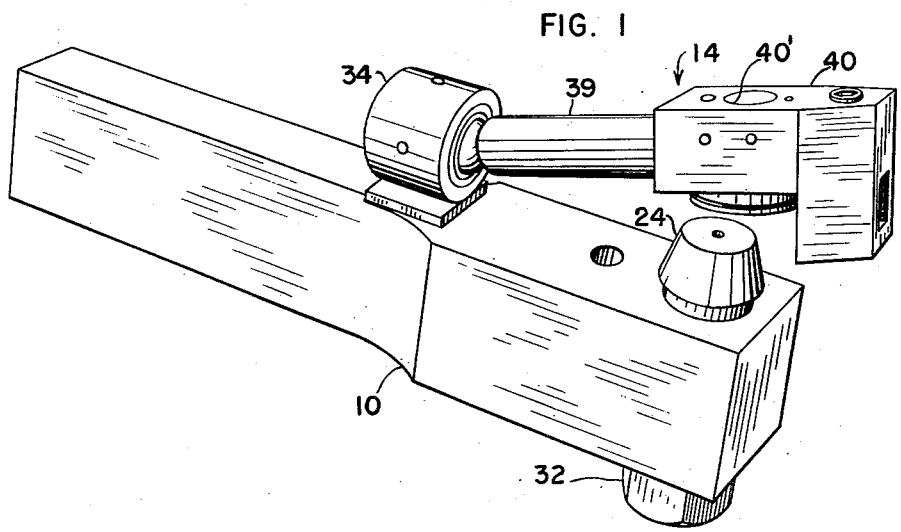
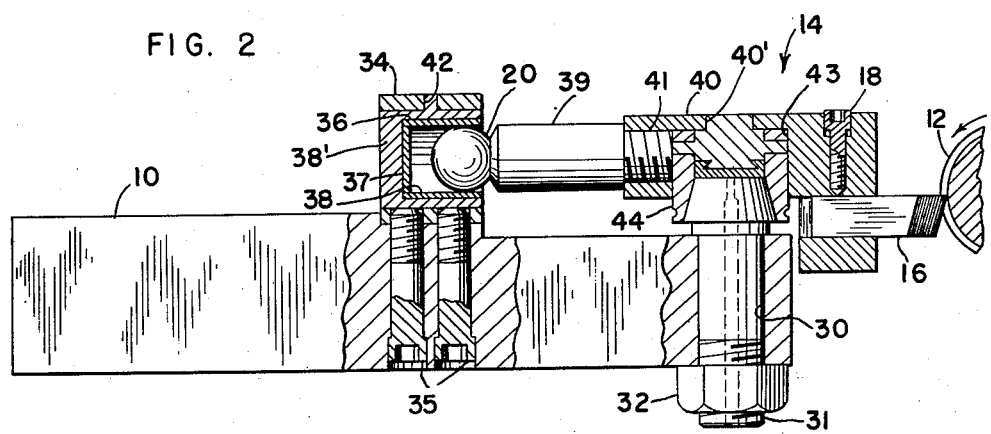
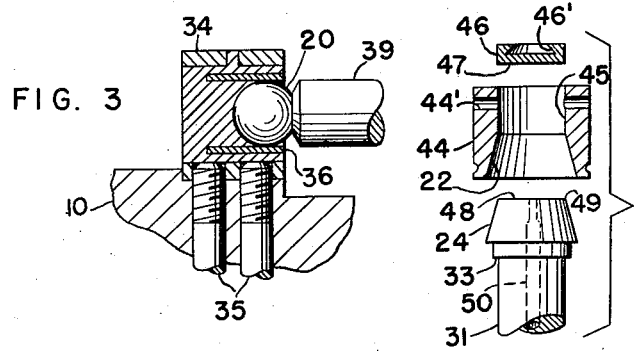
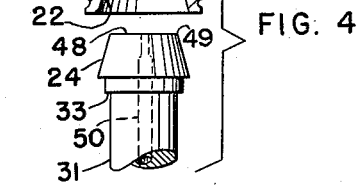
INVENTOR:
ALBERT C. WARNER
by James E. Nilles
Attorney

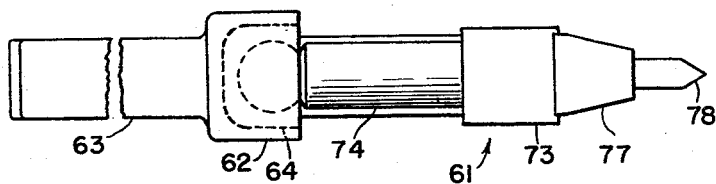
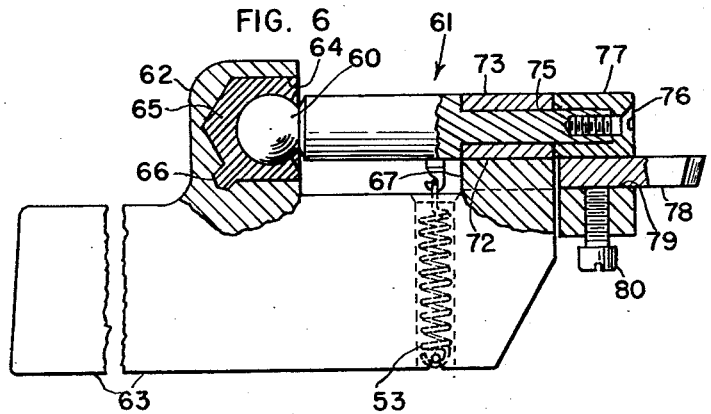
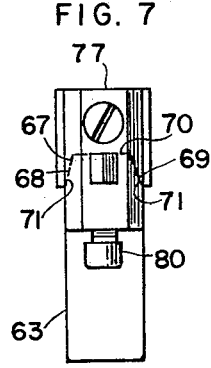
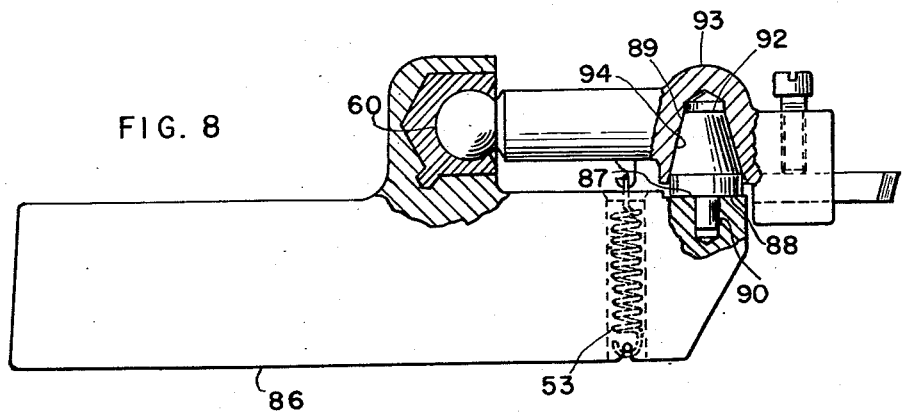

United States Patent Office 2,810,188
Patented Oct. 22, 1957

2,810,188

THREAD CUTTING TOOL

Albert C. Warner, Estes Park, Colo.

Application March 28, 1955, Serial No. 497,065

9 Claims. (Cl. 29—96)

This invention relates to metal working machine cutting tools. More particularly it relates to a screw cutting tool of the type which swings out of engagement with the workpiece when the rotation of the workpiece is reversed.

This application is a continuation-in-part of my co-pending application Serial Number 467,803, filed November 9, 1954, now abandoned.

In cutting a helical screw, where this invention finds particular utility, it is necessary to make many passes over the length of the workpiece, for each pass the tool being set progressively deeper into the piece, in order to complete the thread. When one cutting pass has been completed, the tool must be positioned at the starting end of the piece in preparation for the next cut. In many instances the machine operator is required to withdraw the tool from the work, return the tool to the starting end of the piece, adjust the tool to its proper cutting depth and allow it to make its next cutting pass. This, of course, is tedious, inaccurate and very time consuming. Automatic machines are in use wherein the tool is automatically (either by electrical, cam or other means) cycled through its various steps in the proper sequence. These machines, however, are of necessity very intricate, require frequent calibration and adjustment, and are obviously very expensive.

It has been proposed in the past to allow the tool to be so mounted that it will swing away from the workpiece and out of cutting engagement therewith when the machine, usually a lathe, is reversed in order to return the tool to its starting position. This type of tool, however, has not found wide acceptance, due to the inherent backlash in the machine, particularly its gears, which prohibits the tool from following the thread exactly during the return stroke. In such prior art devices the heel of the cutting tool invariably mars or gouges the formed thread surface when it is being returned to the starting end. It is to an improvement in this type of tool, and the method of making it, that this invention is directed.

An object of this invention is to provide a screw cutting tool which is very accurately and securely seated when in the cutting position and which, when the machine is reversed, is free to swing out of cutting engagement with the workpiece, and is so constructed so as to preclude any injurious contact with the thread while being returned to the starting position.

It is an object of this invention to provide a screw cutting tool which is accurately and securely located in its cutting position and which is free to swing out of cutting engagement with the piece when the latter is reversed, said tool being so mounted so as to permit it to rotate about an axis generally normal to the workpiece and move slightly in an axially direction relative to the workpiece so as to preclude the heel of the tool from marring or gouging the previously formed thread surfaces.

It is an object of this invention to provide a screw cutting tool having means to accurately locate and rigidly hold it in the cutting position yet which will allow the tool to have extreme flexibility in all directions when being returned in preparation for another cutting pass.

It is an object of this invention to provide a cutting tool which is accurately and rigidly located in the cutting position and which is universally mounted, relative to its support, so as to be completely free of binding engagement with the workpiece when the rotation of the latter is reversed.

It is still a further and more specific object to provide a tool of the above type in which the tool itself is so located, relative to the locating and holding means, that any side forces on the tool are below said means thereby contributing to the equilibrium of the tool.

It is a further and important object of this invention to produce a tool of the above type by a method which eliminates extremely close machining tolerances and therefore results in an inexpensive, yet highly efficient tool, which a machinist with comparatively little skill is able to produce.

Other objects and advantages will become more apparent as the description progresses, reference being had to the accompanying drawings in which is illustrated a preferred form of the invention, but it is to be understood that various changes and modifications of parts may be made without departing from the scope of the invention as intended to be defined by the appended claims.

In the drawings:

Figure 1 is a perspective view of a holder assembly embodying this invention.

Figure 2 is an elevational side view, in section, of the device shown in Figure 1.

Figure 3 is an elevational side view of a modified form of the connection, shown in Figure 2, between the shank and the tool holder.

Figure 4 is a cross sectional view, on an enlarged scale, of certain parts shown in Figure 2.

Figure 5 is a plan view of a modification of the invention.

Figure 6 is an elevational view, partially in section, of the embodiment shown in Figure 5.

Figure 7 is a front, end, elevational view of the device shown in Figure 6.

Figure 8 is an elevational view, with parts in section, of another modification of the invention.

Referring more particularly to Figures 1 and 2, the entire tool assembly is mounted by its elongated shank 10 in a conventional tool post (not shown) of a lathe, or similar machine, for movement along the length of the workpiece 12. The tool post is generally carried on a cross carriage and together with the tool assembly are thereby movable toward and away from the workpiece. The tool holder 14 has secured therein the tool 16 by means of the set-screw 18.

The tool holder 14 terminates at its rear end in the form of a ball 20 which is mounted to the shank 10 for universal movement relative thereto. In this embodiment of the invention the tool holder 14, in addition to universal movement, is also capable of slight sliding movement, when in the non-cutting position, relative to the shank 10. The collar 34 is secured by means of bolts 35 which are threadably engaged in collar 34. Collar 34 may be considered a part of shank 10 and may be made integral therewith as, for example, in a single casting. A hardened steel inner collar 36, having an end cap 37, is held within outer collar 34 by "type" metal 38' which has been poured around collar 36 after the latter had been accurately located within collar 34. In order to firmly anchor the type metal, the outer periphery of collar 36 and the rear side of washer 37 are roughened in any suitable manner and the collar 34 is provided with apertures 42 extending therethrough. The internal surface or bore 38 of collar 36 is very smooth and is of such a diameter so as to form a very close fit with ball 20 which is free to turn in collar 36 and slide therein.

The front ends of the tool holder 14 and the shank 10 have cooperative or interengaging mating portions which permit the holder 14 to be very accurately located and rigidly mounted on the shank 10 during the cutting operation. It is absolutely essential, as will be appreciated by those skilled in this art, that the tool be maintained rigid while cutting takes place. In Figure 2 the interengaging mating portions of the holder 14 and shank 10 take the form of a female opening 22 and a male portion 24, respectively. It has been found desirable to have the female opening located in the holder 14, rather than in the shank 10, so as to preclude any chips or foreign matter from accumulating therein. The presence of even the smallest chip will prevent the precise locating of the interengaging parts which is essential for maintaining the exact relationship between the parts while in the cutting position. The shank 10 has a vertical bore 30 extending through its forward end in which is secured the shaft 31. Shaft 31 has a shoulder 33 which is drawn tightly against the upper edge of shank 10 by the nut 32 threadably engaged on the lower end of shaft 31. The upper end of shaft 31 has formed integrally therewith the male mating portion 24 which is of conical shape and terminates in a flat top bearing surface 48. An included angle in the nature of 30 degrees for this cone has proved to be very satisfactory from good bearing support and stability standpoints. In this regard, high twisting moments and side thrusts on the tool 16 are developed and in the illustrations shown it will be noted that the tool is located below the interengaging parts. By so locating the tool relative to the mating parts, the downward component of force on the tool acts to seat the male part tightly in the female opening and prevents any relative tipping movement therebetween. An assembly of very good equilibrium is thereby obtained. Shaft 39 is rigidly secured to the head 40 in any suitable manner, such as the threaded connection at 41. The ball 20, shaft 39 and the head 40 may be considered a single integral tool holder. Indeed, it has been found desirable to make as much of the holder 14, as is economically feasible, from as few parts as possible because of the high strength and rigidity required of this holder. The head 40 has a bore 43 into which is press fitted the hardened bushing 44. The conical shaped female opening 22 is formed in the lower portion of bushing 44 and a bore 45 extends upwardly therefrom through bushing 44. A steel bearing cap 46, having a hardened and ground surface 47, is of such diameter that it fits closely within bore 45 and forms a seat for the top surface 48 of the male part 24 to bear against. These bearing surfaces 46, 47 are necessary for adequate bearing support because, when cutting certain steels and/or at certain depths resulting in extremely high bearing pressures, the sides of the conical shaped male part 24 actually "give" a very slight amount. As previously mentioned extreme rigidity and positive holding between the cooperating mating parts are required and by providing positive support on the top, as well as on the sides, this condition is assured. A hardened steel cap 46 is used to prevent the edge 49 of male part 24 from "gouging" or wearing the surface 47 as would be the case if the surface were formed simply of type metal. This gouging would occur just prior to the holder being firmly seated on the male part 24, i. e., when holder 14 was slightly tilted relative to the shank 10.

The mating surfaces 22, 24, 47 and 48 are all hardened and ground so as to produce an extremely close fit. This condition not only prevents wear, but results in a low coefficient of friction between the mating parts. This is desirable so as to insure that the mating parts seat properly and positively. Because of the closeness of the fit of these parts, they have a tendency to "lock" together and to be sure they quickly and easily disengaged upon reversal of the workpiece, it has been found desirable to provide a relief hole 50 which is drilled through male part 24 and the shaft 31.

The modifications shown in Figures 5 to 8, inclusive, formed the subject matter of my co-pending U. S. application Serial Number 467,803, filed November 9, 1954, which application is about to be abandoned, and of which this present application is a continuation-in-part.

In Figure 6, the means for mounting the rear end of the tool holder 61 comprises a close fitting ball 60 and socket joint which permits universal movement of the holder 61 about the ball 60 but does not allow shifting of the holder to occur in a front and rear direction. A projection 62 is formed as an integral part of shank 63 and has a bore 64 extending only partially therethrough. The ball 60 is set in type metal 65 within bore 64 in a manner which will be more fully described. A small hole 66 is drilled in projection 62, from bore 64, to securely anchor the type metal. This ball and socket type of universal connection between the shank and the tool holder is very satisfactory when the form of interengaging means shown in Figure 6 is utilized. The forward upper end of shank 63 has a male portion 67 formed by side surfaces 68, 69 and the top surface 70. Tool holder 61 has complementary cooperating side surfaces 71 and a top surface 72 which together form the female part. There are thus three pairs of mating surfaces which form a firm and rigid bearing support between the shank and the tool holder. These surfaces must be very accurately formed, hardened and ground. However, these cooperating parts do not prevent fore and aft movement between the holder 61 and the shank 63, but this movement is prevented by the type of ball and socket connection, above described. In other words, with the form of cooperating parts shown in Figure 6, the ball is fixed against any shifting movement relative to the shank.

That part 73 of the tool holder 61, which contains the female part is formed as a separate part in order to make it possible to machine and finish surfaces 71 and 72. The shaft portion 74 of the holder has a reduced portion 75 on which is secured, by the screw 76, the part 73 and the tool receiving part 77. The tool 78 is secured within aperture 79 in part 77 by the set-screw 80.

Figure 8 shows another modification of the invention. The shank 86 has a finished surface 87 on its upper edge on which is seated a finished surface 88 of the male part 89. Stub shaft 90 of the part 89 fits tightly in the bore 91 of shank 86. The upper end of the male part 89 is of conical shape and terminates in a flat surface 92. The tool holder 93 is of one piece construction and a conical opening 94 is formed therein which forms a close fitting connection with the male part 89. The ball and socket joint for securing the rear end of tool holder 93 to the shank 86 is the same as that used in Figure 6.

In operation, with the device shown in Figure 2, when the rotation of the workpiece is reversed after a cutting pass of the tool has been completed, the holder 14 is raised slightly off of the male portion 24. In other words, the female portion 22 is free to wobble around on male support 24 but it is not lifted clear of it. At this stage of operation the tool is free to tip laterally, i. e., about the longitudinal axis of the holder 14; it is free to swing from side to side slightly and is also free to shift slightly fore and aft. The operation of the devices shown in Figures 6 and 8 is similar except no fore and aft shifting of the holder can take place; such movement is prevented by the form of universal connection used here for mounting the rear end of the holder to the shank. In all the embodiments, the tool is completely free of binding engagement with the workpiece and no binding can occur regardless of the misalignment between the thread of the workpiece and the tool. The tool will follow the thread freely when being returned to its starting position and the tool cannot mar the thread previously formed. When the workpiece is again rotated in the cutting direction, indicated by the curvilinear arrow of Figure 2, the tool quickly drops by gravity into cutting position and the pressure on the tool forces the mating surfaces to snap firmly into engagement.

As shown in Figures 6 and 8, a tension spring 53 is connected between the shank and the holder to positively return the tool to working position. In practice, however, it has been found that a spring is not necessary but it does perform the further function of keeping the assembly together when not in use.

In spite of the extreme accuracy required of the various parts of a device of the character above described, a highly efficient tool holder has been provided which is economical to manufacture and can be produced by a machinist of ordinary skill.

Referring again to Figure 2, after the bushing 44 has been completely machined and the conical shaped female opening 22 has been hardened and ground, the bushing is press fitted into the bore 43. The cap 46 is then placed on the top surface 48 of the male part 24 and the completed assembled tool holder 14 is then clamped onto male part 24 in the proper position relative to shank 10. Type metal is then poured through the opening 40' in head 40 and completely fills the anchoring undercut 46' in cap 46, anchor holes 44' in bushing 44, bore 45 and the opening 40'. Upon hardening of the type metal, the cap is accurately and firmly anchored tightly against its mating surface 48 of male part 24. The ball 20 is then accurately and easily mounted within collar 34 as follows. The rear end of the entire assembly is upended and the inner collar 36 with the washer 37 fitted therein is positioned over ball 40 and held in its proper position by a suitable support at its lower end. Type metal 38' is then poured into the rear end (then facing upwardly) of collar 34 and it flows between collars 34 and 36 and into anchor holes 42. Thus the holder 14 is accurately located at both ends relative to the shank 10.

The procedure for mounting the ball relative to the shank is similar for the embodiments shown in Figures 6 and 8. After the male and female portions have been finished, the tool holder is assembled and clamped to the shank in its precisely correct position; the ball 60, which is accurately formed and smoothly finished, extends within bore 64 at this time. The entire assembly is then positioned with the opening of bore 64 extending upwardly and "type" metal is poured in bore 64, surrounding ball 60. The type metal used is conventional and of such a chemical analysis that it will not change in volume upon cooling. However, various substances may be used, other than type metal, which can be poured when in a molten condition and which solidify without appreciable shrinkage. Thus a ball and socket joint is formed with practically no clearance and the tool holder accurately and positively located on the shank. It would be an extremely difficult and time-consuming task to so accurately locate both front and rear ends of the holder on the shank by other means. This form of ball and socket joint has proven satisfactory under many operations. However, as previously mentioned, very high bearing pressures are developed in a tool holder of this character and a modification, shown in Figure 3 has proved advantageous in accommodating these high bearing pressures which develop, in a vertically upward direction, at the rear end of the tool holder. Instead of providing a cap 37 for the steel collar 36, as shown in Figure 2, the type metal is poured against the rear side of ball 20 and accurately sets collar 36 within collar 34. None of the type metal can flow past the ball 20 and collar 36. With this type of universal connection, no rearward shifting of the holder is permitted, nor is such shifting permissible when the modification of the interengaging portions of Figure 6 is utilized. Obviously a complete ball need not be formed on the end of shaft 39 but it would be sufficient if only the end of shaft 39 were made semi-spherical. It is not intended to limit the invention to the type of universal connection shown. The form shown in Figures 2 and 3 provide a hard bearing surface for the ball 20 to accommodate the high thrust pressure in a vertical direction, and yet these embodiments provide a highly efficient and economical method for accurately locating the tool holder on the shank.

Having thus shown and described the invention, what is desired to be secured by Letters Patent is:

1. In a tool holder assembly; a shank having a first interengaging mating part, a tool holder universally mounted to said shank at a point spaced rearwardly from said part, said tool holder having a second interengaging mating part adapted to engage said first part and rigidly support said holder on said shank when in the operating position, said parts adapted to be freely disengageable when in the non-operating position whereby said toolholder can tip laterally relative to said shank.

2. In a tool holder assembly; a shank having a male interengaging portion, a tool holder universally mounted to said shank at a point spaced rearwardly from said portion, said tool holder having a female interengaging portion adapted to engage said male portion and rigidly support said holder on said shank when in the operating position, said portions adapted to be freely disengageable when in the non-operating position whereby said toolholder can tip laterally relative to said shank.

3. In a tool holder assembly; a shank having a first interengaging mating part and also having a socket rearwardly from said part, a tool holder having its rear end terminating in a semisphere and adapted to fit snugly in said socket, for universal movement relative thereto, said tool holder also having a second interengaging mating part adapted to engage said first part and rigidly support said holder on said shank when in the operating position, said parts adapted to be freely disengageable when in the non-operating position.

4. In a tool holder assembly; an elongated shank having adjacent its front end a male interengaging portion, said shank also having a socket formed therein and located rearwardly of said male portion, a tool holder having at its rear a ball adapted to fit snugly in said socket for universal movement relative thereto, said tool holder having a female interengaging portion adapted to engage said male portion and rigidly support said holder on said shank when in the operating position, said portions adapted to be freely disengageable when in the non-operating position, said holder adapted to rigidly mount a cutting tool at its forward end and at a point substantially below said interengaging portions.

5. In a tool holder assembly; a shank having a cone-shaped interengaging male part, a tool holder universally mounted to said shank at a point spaced rearwardly from said part, said tool holder having a cone-shaped opening forming a female interengaging part adapted to tightly engage said male part and rigidly support said holder on said shank when in the operating position, said parts adapted to be freely disengageable when in the non-operating position.

6. A device as recited in claim 5 further characterized in that said male part has a flat top bearing surface, said female opening terminates in a flat upper surface against which said male part bears.

7. In a tool holder assembly; an elongated shank having adjacent its front end a male interengaging portion, said shank also having a frontwardly and rearwardly extending bore formed therein and located rearwardly of said male portion, a tool holder having at its rear a ball adapted to fit snugly in said bore for universal and slidable movement relative thereto, said tool holder having a female interengaging portion adapted to engage said male portion and rigidly support said holder on said shank when in the operating position, said portions adapted to be freely disengageable when in the non-operating position, said holder adapted to rigidly mount a cutting tool at its forward end and at a point substantially below said interengaging portions.

8. A device as defined in claim 7, further characterized in that said shank has a collar secured thereto the inner surface of which constitutes said bore.

9. In a tool holder assembly; an elongated shank having adjacent its front end a cone-shaped male interengaging portion having a flat top bearing surface, said shank also having a frontwardly and rearwardly extending bore formed therein and located rearwardly of said male portion, a tool holder having at its rear a ball adapted to fit snugly in said bore for universal and slidable movement relative thereto, said tool holder having a female interengaging portion, said female portion having a cone-shaped opening which terminates in a flat upper surface adapted to engage said male portion and rigidly support said holder on said shank when in the operating position, said portions adapted to be freely disengageable when in the non-operating position, said holder adapted to rigidly mount a cutting tool at its forward end and at a point substantially below said interengaging portions.

References Cited in the file of this patent
UNITED STATES PATENTS

| | | |
|---|---|---|
| 272,139 | Houghton | Feb. 13, 1883 |
| 328,707 | Noyes | Oct. 20, 1885 |
| 993,553 | Rosenbeck | May 30, 1911 |
| 1,407,249 | Etheredge | Feb. 21, 1922 |
| 1,422,652 | Benoit | July 11, 1922 |
| 1,681,408 | Johannesmeyer | Aug. 21, 1928 |
| 1,896,360 | Hazelton | Feb. 7, 1933 |